United States Patent [19]

Buzbee

[11] Patent Number: 5,732,210
[45] Date of Patent: Mar. 24, 1998

[54] USE OF DYNAMIC TRANSLATION TO PROVIDE FAST DEBUG EVENT CHECKS

[75] Inventor: William B. Buzbee, Half Moon Bay, Calif.

[73] Assignee: Hewlett-Packard Company, Palo Alto, Calif.

[21] Appl. No.: 616,396

[22] Filed: Mar. 15, 1996

[51] Int. Cl.$^6$ .................................................. G06F 11/00
[52] U.S. Cl. .................. 395/183.14; 395/704; 395/705; 395/183.11
[58] Field of Search ..................... 395/183.01, 183.13, 395/183.14, 701, 704, 705, 710, 707, 708; 364/267.91, 275.5

[56] References Cited

U.S. PATENT DOCUMENTS

| 4,720,778 | 1/1988 | Hall et al. | 395/183.14 |
| 5,450,586 | 9/1995 | Kuzaka et al. | 395/180 |

FOREIGN PATENT DOCUMENTS

| 6062985 | 3/1994 | Japan | G06F 11/28 |

OTHER PUBLICATIONS

"HP/DDE Debugger User's Guide HP 9000 Series 700/800 Computers", Hewlett Packard, HP Part No. B3476–90005, Apr. 1994, pp. 2-11 through 2-13.

"PA-RISC 1.1 Architecture and Instruction Set manual", Hewlett Packard, HP Part No. 09740–09939, Feb. 1994, pp. 5-138.

R. Cmelik, D. Keppel "Shade: A Fast Instruction-Set Stimulator for Execution Profiling", 1994 ACM Sigmetrics Conference, 1994.

R. Cmelik, D. Keppel "Shade: A Fast Instruction-Set Simulator for Execution Profiling", Technical Report UWCSE 93-06-06, 1993.

T. Halfhill, "Emulation: RISC's Secret Weapon" BYTE Apr. 1994, pp. 119, 120, 122, 124, 126, 128, 130.

Ogle et al. "Application Dependent Dynamic Monitoring of Distributed and Parallel Systems" 1993 IEEE, pp. 762-778.

Anger et al. "Combining Static and Dynamic Analysis of Concurrent Programs" IEEE 1994, pp. 89-98.

*Primary Examiner*—Albert Decady

[57] ABSTRACT

Dynamic translation is used during debugging of a computer application process. During runtime, the first application is dynamically translated to produce translated code. Debugging code, such as a conditional breakpoint, may then be added to the translated code.

17 Claims, 8 Drawing Sheets

USE OF DYNAMIC TRANSLATION TO PROVIDE FAST DEBUG EVENT CHECKS

BACKGROUND

The present invention concerns debugging programs and pertains particularly to the use of dynamic translation to provide fast debug event checks.

Programs are generally written in a high level programming language. This high level language, often referred to as source code, is translated by a compiler program into an assembly language. The binary form of the assembly language, called object code, is the form of the code actually executed by a computer. The object code is generally first produced in object code modules which are linked together by a linker. For the purpose of the present application, the term "compile" includes both the process of producing the object code modules and linking the object code modules together.

Code debuggers are programs which aid a programmer in finding errors in code. They are extremely useful tools for improving the efficiency of the code debugging process. One of the important features of a code debugger is to allow a programmer to stop the execution of code and to check the values in each user resource the code is operating upon. A user resource is typically a variable defined in the source code. The values in the user resources give clues to indicate the source of trouble when a program is not operating correctly.

In order for a debugger to set a breakpoint at a particular address in an application, if the application is currently running, the application must be stopped. On computing systems which are operating under the UNIX operating system, this is typically done by sending the application a signal. Once the application is stopped, the debugger replaces the object code currently residing at the particular address with a special instruction which will cause execution to halt when it is reached. For example, for computing systems which are designed to execute a Precision Architecture Reduced Instruction Set Computer (PA-RISC) instruction set, a break instruction would typically be used to cause execution to halt. See "PA-RISC 1.1 Architecture and Instruction Set Reference Manual", Third Edition, Hewlett-Packard Company Part Number 09740-90039, p. 5-138.

After the break instruction is placed in the object code, the application is allowed to resume execution. When and if execution of the application reaches the particular address, the break instruction is encountered and execution of the application is halted. Control is then given to the debugger. To remove the breakpoint at the particular address, the debugger replaces the break instruction with the instruction that was originally at the particular address.

For example, Table 1 below sets out a code fragment which is a loop structure which causes the statement on source line two to be executed ten times.

TABLE 1

| Source Line# | Source Code |
|---|---|
| 1 | for (i=0; i<10; i++) |
| 2 | printf ("i equals %d\n",i) |

For the example given in Table 1, a debugger sets a breakpoint at source line number two and the object code was executed, execution would be halted before execution of the "printf" statement. If the debugger is then instructed to print the value of "i", the value printed would indicate that i equaled 0.

In addition to insertion of a break instruction, some debuggers allow for the use of conditional breakpoints, also called event checks. With a conditional breakpoint or event check, the debugger is instructed to evaluate an expression when it reaches a certain code location. If the condition is satisfied, the debugger halts execution of the application or performs some specified action. If the condition is not satisfied, the debugger allows the program to continue executing.

For the code example set out in Table 1 above, to set a conditional breakpoint, the debugger could, for example, set a breakpoint at line 2 which indicates that if "i" equals 3 then stop, else continue. In this case, upon the object code being executed, the instruction at source code line 3 would be executed three times (i==0, i==1 and i==2) before the conditional expression is satisfied. Each time the conditional expression ("i" equals 3) is not satisfied, the debugger, after checking the conditional expression, allows the application to resume executing.

When the conditional expression is satisfied, the debugger stops execution of the application and notifies a user. Alternately, the debugger may take some other action based on previously received instructions from a user.

In order to implement a conditional breakpoint at a particular address in an application, the debugger will save a copy of the conditional expression to be evaluated. A breakpoint is then inserted into the application, as discussed above.

After the break instruction is placed in the object code, the application is allowed to resume execution. When and if execution of the application reaches the particular address, the break instruction is encountered and execution of the application is halted. Control is then given to the debugger. The debugger then will interpret the previously saved conditional expression. If the conditional expression is false, the instruction originally at the particular address will be executed, and the debugger will cause the resumption of execution of the application. If the conditional expression is true, the debugger will not cause the resumption of execution of the application, but instead will signal a user or perform some other action based on previously received instructions from the user.

One problem with current implementations of conditional break instructions is that they have a very high overhead. This is because in order for a debugger to evaluate a conditional expression, it is necessary to execute a break in order for the debugger to obtain control of the program flow. However, in order to execute a break instruction, it is generally required that hundreds or even thousands of additional instructions are executed in order to save a current state of the computer at the time the break is executed. Saving the current state of the computer is necessary in order to allow for resumption of execution of the application. For this reason, use of conditional break can significantly impede performance of an application.

SUMMARY OF THE INVENTION

In accordance with the preferred embodiment of the present invention, dynamic translation is used during debugging of a first application residing in a computing system. During runtime, the first application is dynamically translated to produce translated code. Debugging code, such as a conditional breakpoint, may then be added to the translated code.

In an alternative embodiment of the present invention only blocks of code modified by the debugger are dynamically translated. The remaining object code for the first application is executed without being dynamically translated.

A block of code is a grouping of one or more instructions. The block of code may thus consist of a single instruction, a straight-line run of instructions terminated by a branch (similar to a "basic block" as used by a compiler), an entire procedure, or some other grouping of instructions. In the preferred embodiments of the present invention, the block of code is the unit of translation utilized by a dynamic translator. This unit of translation may be, for example, a procedure, a basic block, a page, a cache line, an instruction, or some other grouping of instructions.

The present invention facilitates usage of conditional breakpoints and other debugging code by a debugger, without requiring that a debugger unnecessarily halt execution of an application, for example to check a conditional expression. This allows for the utilization of debugging code such as conditional breakpoints within an application with minimal disruption to the performance of the application.

DESCRIPTION OF THE PREFERRED EMBODIMENT

Figure 1:
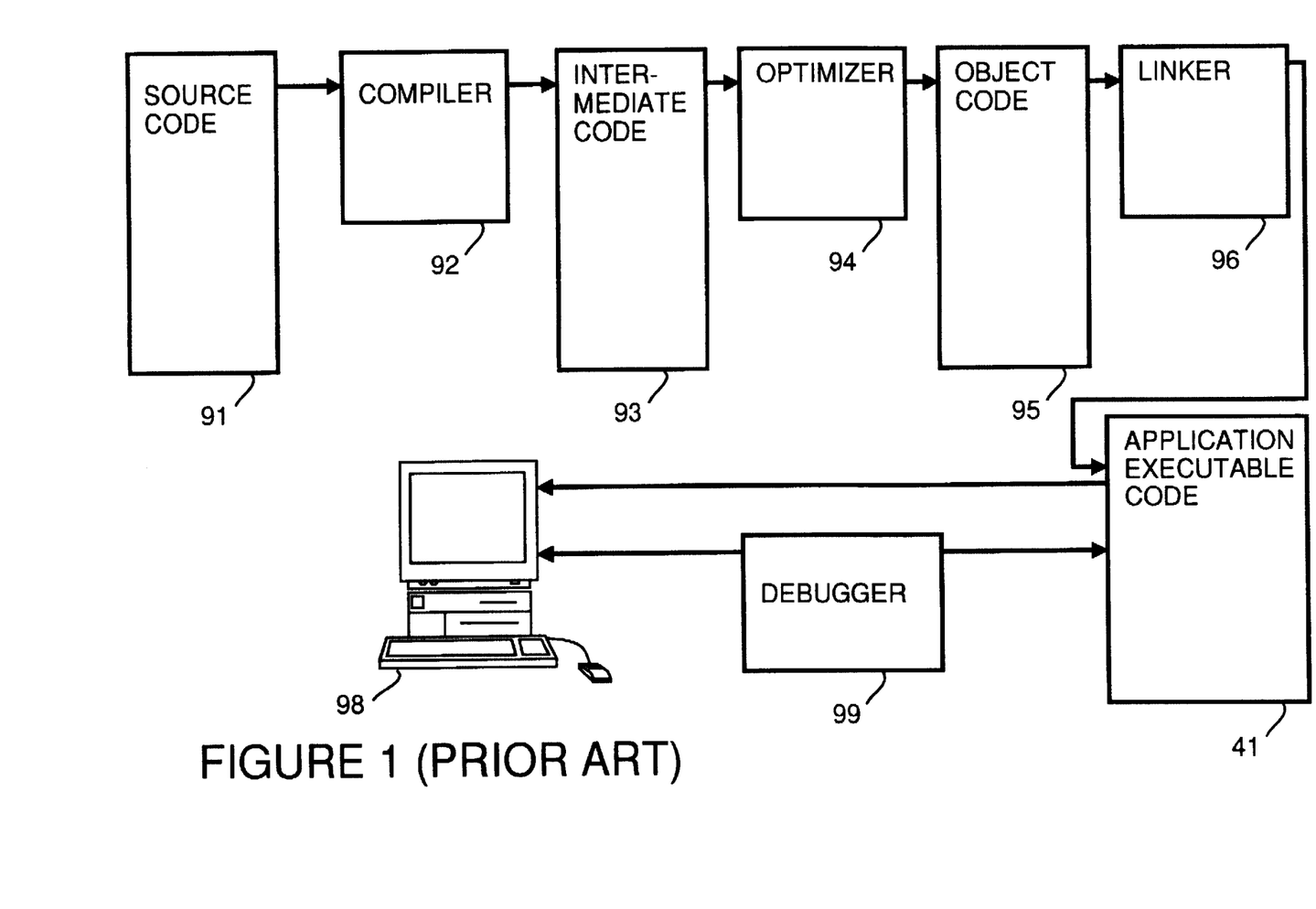
FIG. 1 shows a block diagram of a computing system which utilizes a compiler to produce executable code which runs concurrently with a debugger in accordance with the prior art.

FIG. 1 shows a block diagram of a computer system which uses a compiler system to produce executable code for an application. A compiler 92 receives source code 91 and produces intermediate code 93. The intermediate code is a list of object (assembly) language instructions. An optimizer 94 receives the intermediate code 93 and produces optimized object code 95. A linker 96 receives optimized object code 95 and produces application executable code 41 (also called application 41). Application executable code 41 may then be executed by a computing system 98. A debugger 99 running concurrently with application executable code 41 is used to debug application executable code 41.

Figure 2:
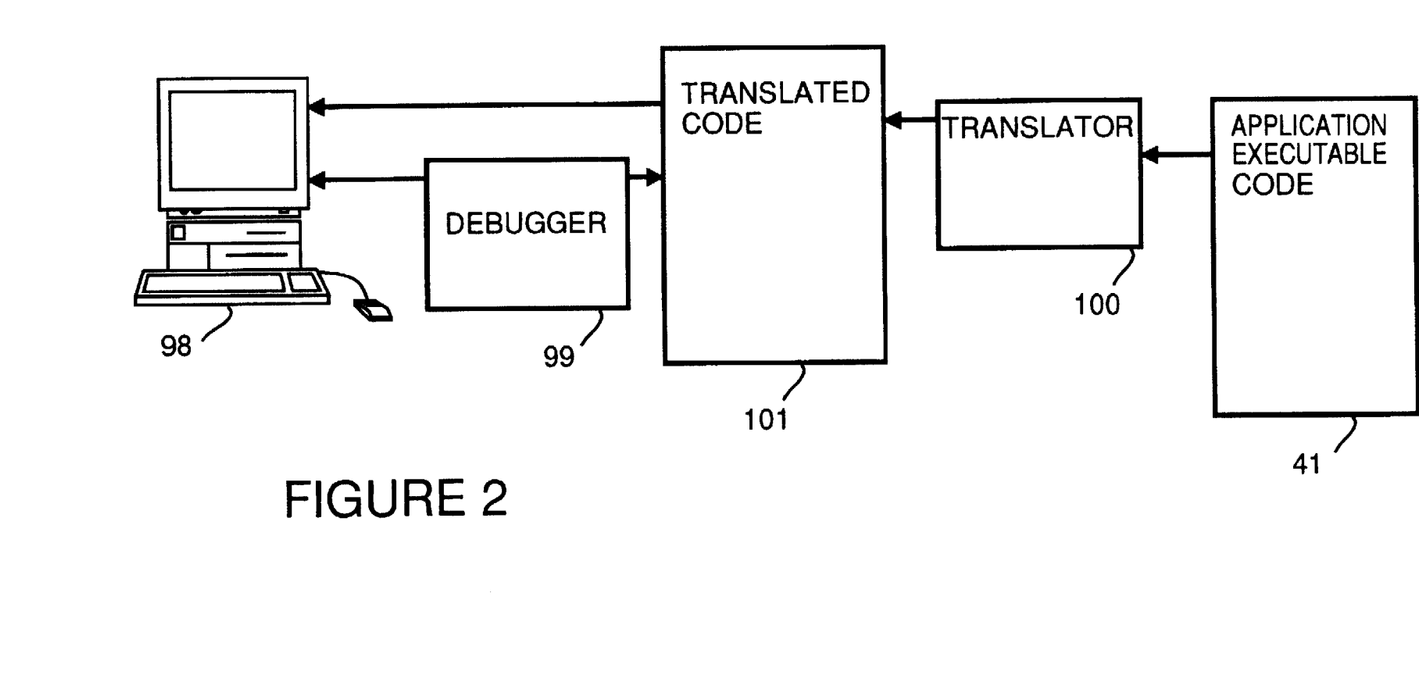
FIG. 2 shows a block diagram of a computing system in which dynamically translated executable code which runs concurrently with a debugger in accordance with the preferred embodiment of the present invention.

FIG. 2 illustrates use of dynamically translated executable code during debugging in order to insert conditional breakpoints. Rather than directly running application executable code 41, a dynamic translator 100 is used to produce translated code during runtime. Blocks of code from application executable code 41 are translated at execution time. The translated blocks of code are then stored in memory as translated code 101. Translated code 101 is stored in memory so that each block of code which is executed a number of times need be translated only once during runtime. This approach allows the flexibility of not requiring that code be translated before runtime, but reduces the overhead that would result if a block of code were translated every time it was executed.

Translated code 101 includes both executable code originally within application executable code 41 as well as any inserted conditional breakpoints. Debugger 99 inserts the conditional breakpoints, including conditional expressions to be evaluated, within translated code 101. Debugger 99 does this indirectly by communicating with dynamic translator 100 to indicate what kind of conditional breakpoint to set and a location within translated code 101 for the conditional breakpoint. Alternately, debugger 99 inserts the conditional breakpoints directly by adding lines of code into translated code 101.

Because the conditional expressions is part of translated code 101, it is not necessary for debugger 99 to halt execution in order to evaluation the conditional expressions. Rather, when translated code 101 is executed, the conditional expressions included within translated code 101 are evaluated. Only when the conditional expression is satisfied is a break instruction executed and control handed over to debugger 99.

Figure 3:
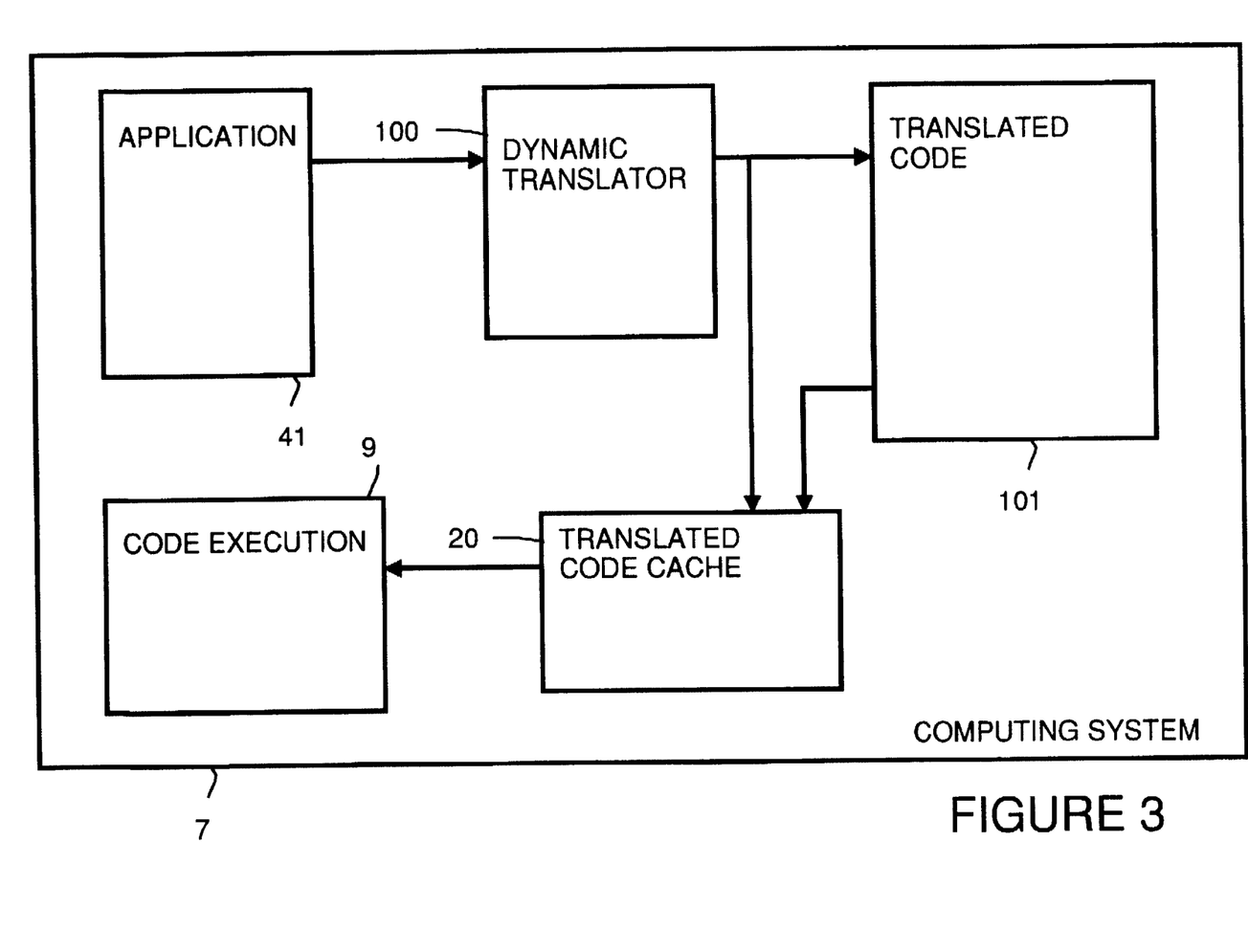
FIG. 3 is a simplified block diagram which shows a computing system which includes a dynamic translator in accordance with the preferred embodiment of the present invention.

FIG. 3 shows a simplified block diagram which shows how a computing system 7 uses dynamic translator 100 to execute application 41. As discussed above, dynamic translator 100 differs from a compiler in that a compiler produces executable code before runtime. Dynamic translator 100 produces translated code 101 during runtime. Blocks of code from application 41 are translated at execution time. The translated blocks of code are shown in FIG. 3 as translated code 101. Translated code 101 is stored in memory (e.g., cache memory) so that each block of code which is executed a number of times need be translated only once during runtime. This approach allows the flexibility of not requiring that code be translated before runtime, but reduces the overhead that would result if a block of code were translated every time it was executed.

In the preferred embodiment, translated code 101 is stored in a translated code cache 20. When translated code cache 20 is full, it may be necessary to discard some previously translated blocks of code in order to make room for newly translated blocks of code. This will require the blocks of code which were discarded to be retranslated if they are used again, but does allow for potential savings in memory usage. Alternately, rather than discarding previously translated blocks of code, they can be stored in system memory.

Figure 4:
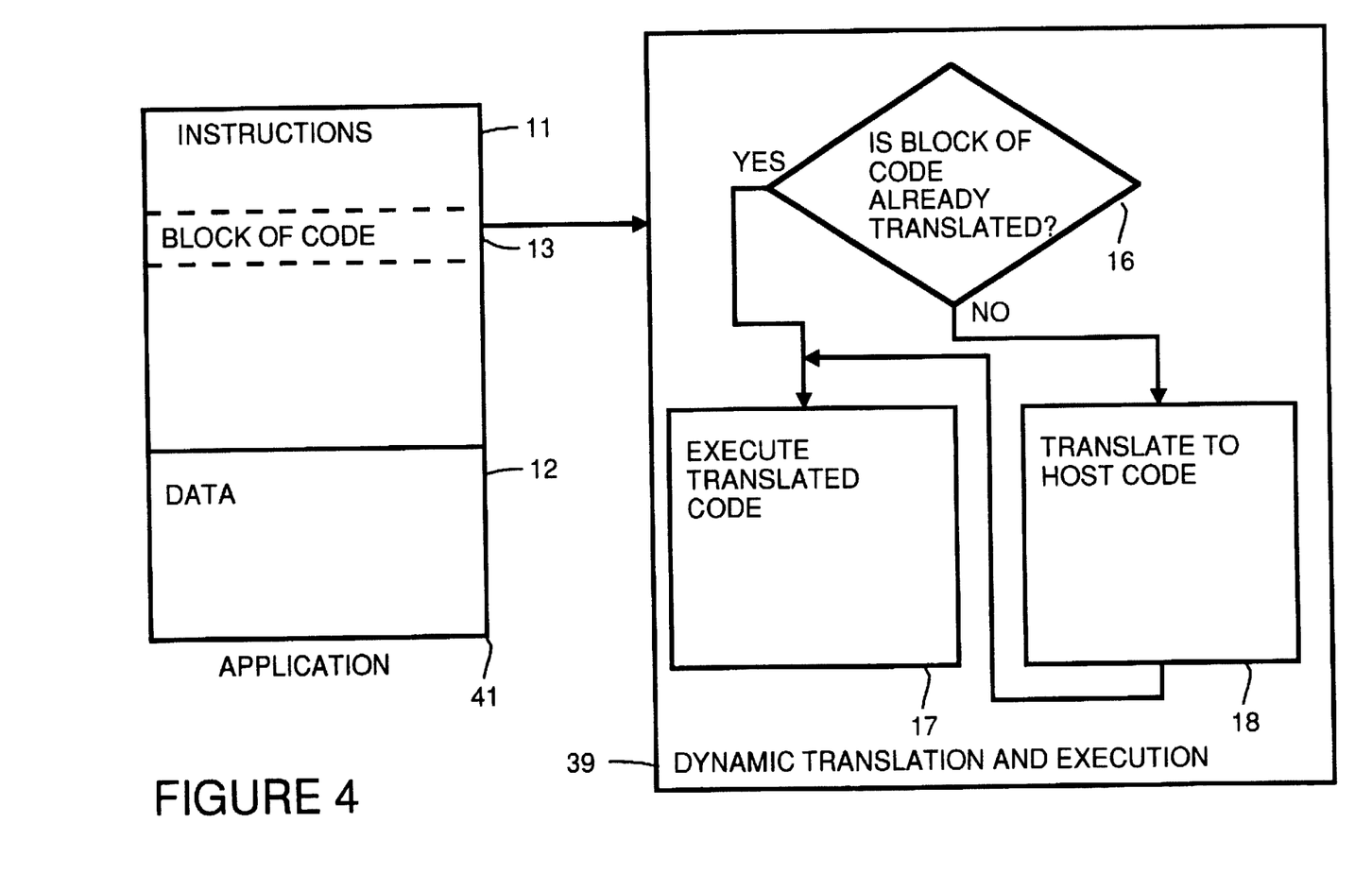
FIG. 4 illustrates use of a dynamic translator to dynamically translate code in accordance with the preferred embodiment of the present invention.

FIG. 4 illustrates use of a dynamic translation and execution process 39 to dynamically translate and execute code application 41. The translation produces translated object code 101. As discussed above, translated code 101 includes debugging information, such as breakpoints and conditional breakpoints.

Application 41 is shown to include instructions 11 and data 12. As instructions 11 within application 41 are executed, whenever a program counter points to a new block of code 13 within application 41, in a step 16, it is determined whether the new block of code 13 has been encountered before by dynamic translation and execution process 39, or accessed by debugger 99 and thus been previously translated. If not, in a step 18 the block of code is translated to object code which is native to the host computer system. As discussed above, the block of code to be translated may already be native to the host computer system so that the translation may be merely object code to object code translation which facilitates the introduction of additional debugging code to the translated object code. In a step 17, the translated code for block of code 13 is executed.

Figure 5:
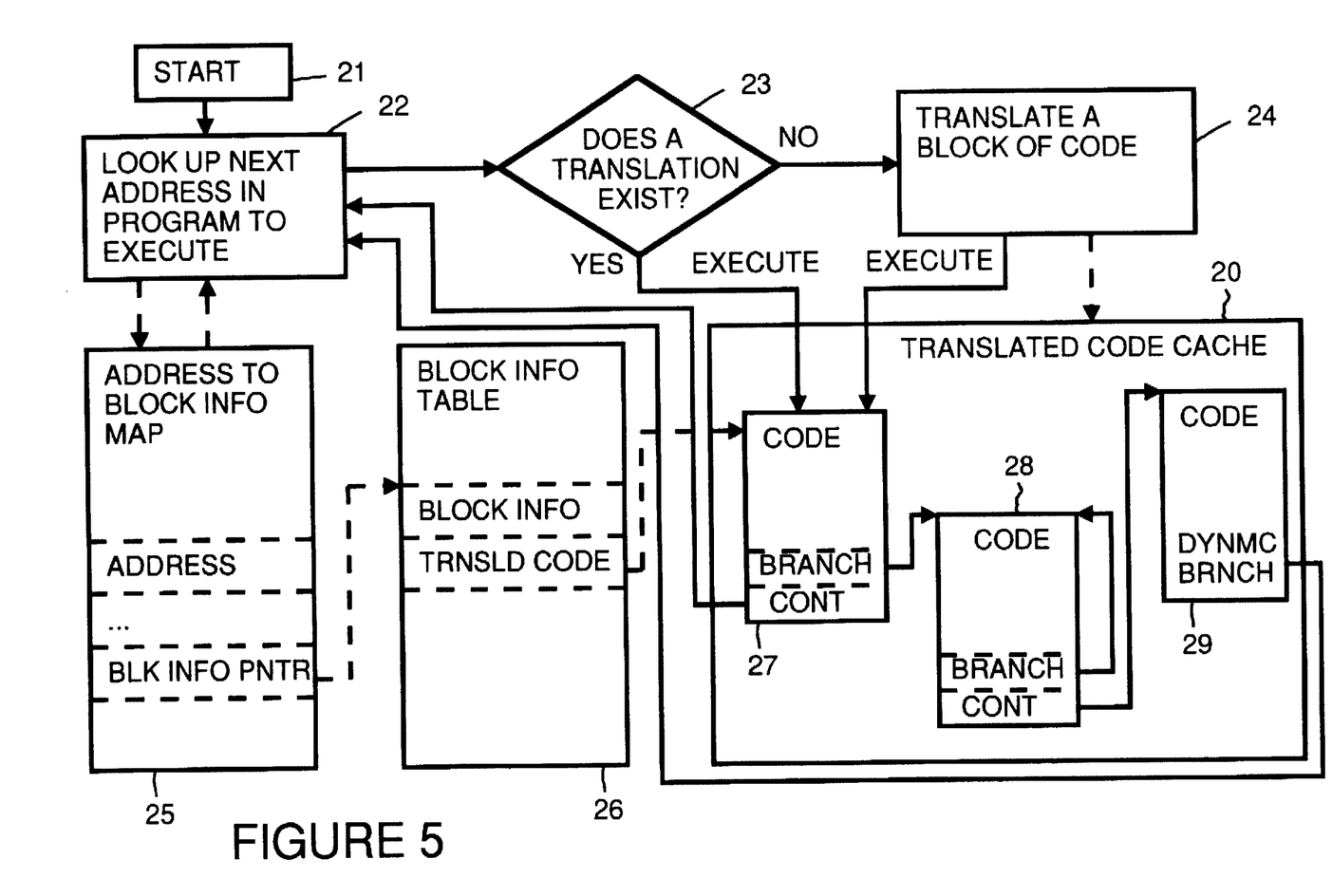
FIG. 5 shows an address to block information map, a block information table, and a translated code cache used by a dynamic translator in accordance with the preferred embodiment of the present invention.

FIG. 5 further illustrates the process of executing an application by dynamic translation and execution process 39. In a step 21, execution of the application is started. In a step 22, a next application address to be executed is looked up. This is done, for example, using an address to block information map 25. Address to block information map 25 includes entries blocks of code in the application. In the preferred embodiment, only addresses for blocks of code which are actually needed for execution are included within block information map 25. These addresses are added at run-time as the blocks of code are needed.

A block of code is a grouping of one or more instructions. The block of code may thus consist of a single instruction, a straight-line run of instructions terminated by a branch (similar to a "basic block" as used by a compiler), an entire procedure, or some other grouping of instructions. In the preferred embodiments of the present invention, the block of code is the unit of translation utilized by dynamic translator 100. This unit of translation may be, for example, a procedure, a basic block, a page, a cache line, an instruction, or some other grouping of instructions.

Each entry in address to block information map 25 includes at least a first program address which identifies the starting address of a block of code within the application. In addition, each entry includes a block information pointer which points to a location in a block information table 26 which includes block information about the block of code. The block information within block information table 26 will include a pointer to translated code if translated code exists for the block or procedure.

After looking up a next application address to be executed, in a step 23, a determination is made as to whether translated code exists for the block of code. This is done, for example, from information retrieved from block information table 26. If a translation does not exist for the block of code, in a step 24, the block of code is translated. The translated code is then executed.

Translated code cache 20 is used to hold translated blocks of code for efficient execution. For example, the number of blocks of code held by translated code cache 20 varies, for example, depending on available memory. Typically, it may be large enough to hold 1000 blocks of code. In FIG. 5, the blocks of code within translated code cache 20 are represented by a code block 27, a code block 28 and a code block 29. Any of these code blocks may include one or more conditional breakpoints inserted (e.g., indirectly) by debugger 99.

Code blocks within translated code cache 20 may branch to other code blocks within translated code cache 20. Thus a branch within code block 27 points to a location within code block 28. Likewise, after executing code in code block 28, flow control of the program will continue to code block 29. As is seen in FIG. 5, after executing code in code block 27, flow control of the program will continue to a code block outside translated code cache 20. Likewise, after executing code in code block 29 a dynamic branch branches to an address within a code block outside translated code cache 20.

Once execution of instructions within a code block within translated code cache 20 has begun, execution of instructions within the code block and other code blocks within translated code cache will continue until an instruction is to be executed which is not within a block of code within translated code cache 20. Upon such a cache miss, program control will return to step 22 where a next application address to be executed is looked up. The appropriate block of code will be translated (if not translated already) and placed in translated code cache 20. Then execution of the application will continue.

As discussed above, a debugger may cause dynamic translator 100 to modify blocks of code within translated code cache 20, for example, by adding breakpoints and conditional breakpoints. In addition, if debugger 99 wants to modify code not yet translated, the code is translated and the translated code is modified by dynamic translator 100 in response to debugger 99. As discussed above, in an alternative embodiment, debugger 99 modifies the translated code directly.

The following tables provide sample code which further illustrate operation of the preferred embodiment of the present invention. Table 2 below shows source code for an example procedure in an application.

TABLE 2

| Source Line# | |
| --- | --- |
| 18 | function bigger_than (int a, int b) { |
| 19 | if (a>b) |
| 20 | return TRUE; |
| 21 | else |
| 22 | return FALSE; |
| 23 | } |

Table 3 below shows the object code for the example procedure, using PA-RISC instructions.

TABLE 3

| Code Address | | | |
| --- | --- | --- | --- |
| 0x100 COMCLR, <=%gf26, %gr25, %ret0 | | | ;Set return (%ret0) to FALSE ;and nullify next instruction ;if a is NOT>b |
| 0x104 LDI | 1, %ret0 | | ;Set return (%ret1) to TRUE |
| 0x108 BV,n | 0 (rp) | | ;return from procedure |

Table 4 below shows a sample entry in address to block information map 25 for the example procedure.

TABLE 4

| Address: | 0x100 |
| --- | --- |
| Blk Info Ptr | [pointer to Block Info Table entry X] |

Table 5 below shows a sample entry X in block information Table 36 for the example procedure.

TABLE 5

| Block Info: | Normal_Procedure |
|---|---|
| Translated Code: | [pointer to address "Y" translated code cache] |

Table 6 below shows the object code for the example procedure in the translated code cache 20.

TABLE 6

| Translated Code Address | | | |
|---|---|---|---|
| Y | LDW | ARG0 (p), %t1 | ;Load value of %arg0 into temp register |
| Y+4 | LDW | ARG1 (p), %t2 | ;Load value of %arg1 into temp register |
| Y+8 | COMCLR, <=%t1, %t2, %ret0 | | ;Set return (%ret0) to FALSE ;and nullify next instruction ;if a is NOT>b |
| Y+0xC | LDI | 1,%ret0 | ;Set return (%ret1) to TRUE |
| Y+0x10 | BV,n | 0 (rp) | ;return from procedure |

Table 7 below shows the object code for the example procedure in the translated code cache 20 after the dynamic translator (in response to communication from the debugger) sets a conditional breakpoint (if (a==b) stop else continue) at the original address 0×100, which corresponds in this case to address Y in the translated code cache.

TABLE 7

| Translated Code Address | | | |
|---|---|---|---|
| Y | LDW | ARG0 (p), %t1 | ;Load value of %arg0 into temp register |
| Y+4 | LDW | ARG1 (p), %t2 | ;Load value of %arg1 into temp register |
| Y+8 | COMCLR, <>%t1, %t2, %gr0 | | ;if (a!=b) nullify next instruction |
| Y+0xC | BREAK | | ;stop if (a==b) |
| Y+0x10 | COMCLR, <=%t1, %t2, %ret0 | | ;Set return (%ret0) to FALSE ;and nullify next instruction ;if a is NOT>b |
| Y+0x14 | LDI | 1,%ret0 | ;Set return (%ret1) to TRUE |
| Y+0x18 | BV,n | 0 (rp) | ;return from procedure |

Figure 6:
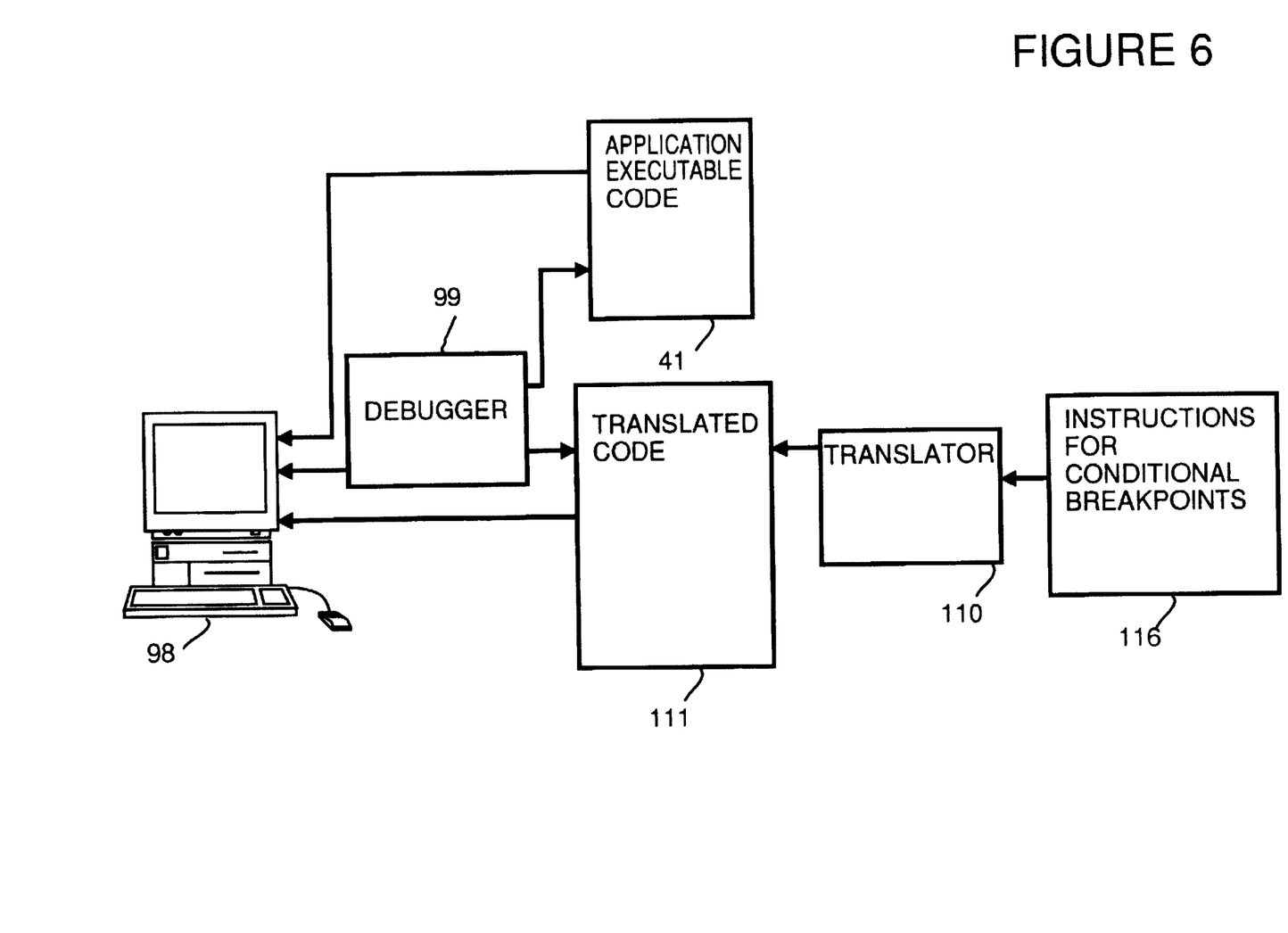
FIG. 6 shows a block diagram of a computing system in which instructions implementing conditional breakpoints are dynamically translated in accordance with an alternate preferred embodiment of the present invention.

FIG. 6 illustrates use of an alternate embodiment of the present invention where dynamic translation is used only for code which is to have conditional breakpoints. In the alternate embodiment application executable code 41 is directly executed without dynamic translation. Dynamic translator 110 is used to produce translated code during runtime, but only for blocks of code modified (directly or indirectly) by debugger 99. Blocks of code modified by debugger 99 are translated and then stored in memory as translated code 111. Translated code 111 is stored in memory so that each block of code which is executed a number of times need be translated only once during runtime. This approach allows the flexibility of allowing insertion of conditional breakpoints in translated code.

For example, this works effectively when it is desirable to place a conditional breakpoint in a procedure within a shared library. As described more fully below, the linkage table is modified so that when the procedure within the shared library is called, the call is subverted to the dynamic translator. The dynamic translator then translates the procedure and inserts the conditional breakpoint code (as directed by the debugger). The translated code is then cached to avoid the need for retranslation.

Figure 7:
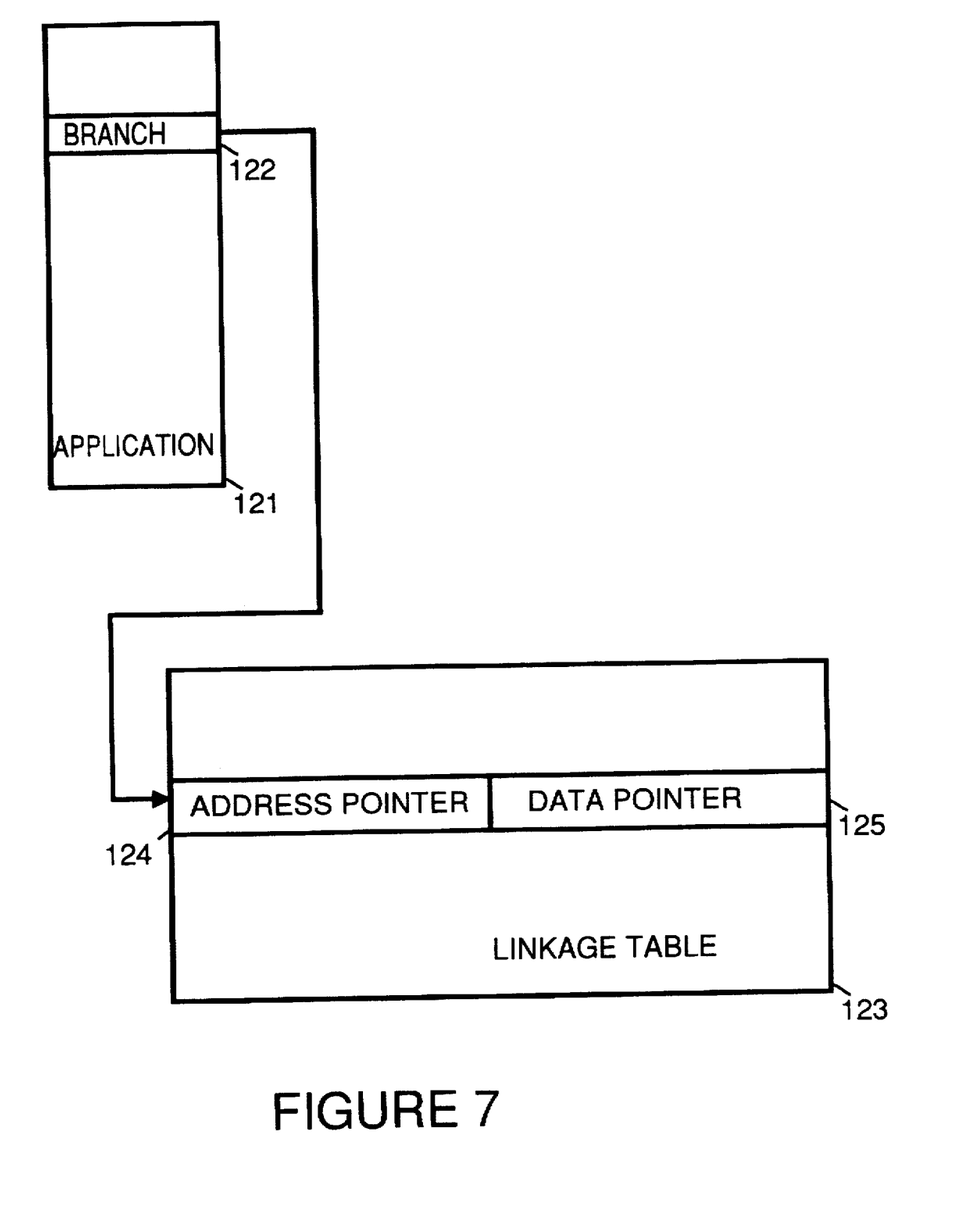
FIG. 7 and FIG. 8 illustrate changes made to a linkage table in order to implement use of conditional breakpoints within a shared library in accordance with an alternate preferred embodiment of the present invention.

FIG. 7 illustrates a normal implementation of the call mechanism to enter a shared library. At the location in the application object code 121 which calls the shared library, a branch mechanism 122 uses an entry in a linkage table 123. The linkage table entry includes an address pointer 124 to a shared library routine in the shared library and a data pointer 125 which points to data for the shared library routine. The branch mechanism 122 will effect a branch to the shared library routine by loading address pointer 124 and data pointer 125 from the linkage table entry, and then branching to the address specified by address pointer 124. All the entries within linkage table 123 are loaded at load time by the dynamic loader.

Figure 8:
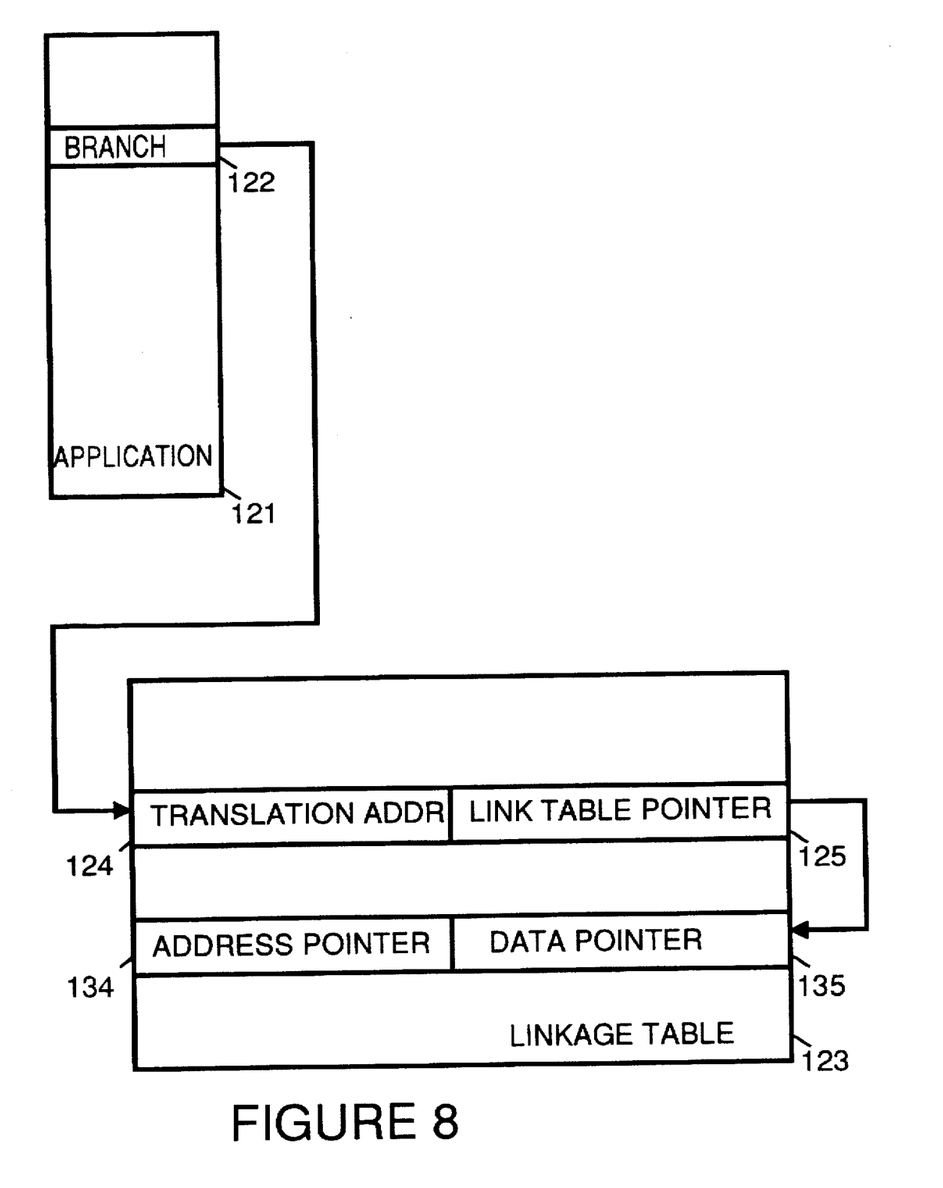

FIG. 8 illustrates changes to linkage table 123 made to implement the call mechanism to enter a shared library when the code for shared libraries is dynamically translated. At load time, the dynamic translator creates a new linkage table entry for the values originally in address pointer 124 and pointer 125. The values are moved, respectively, into an address pointer 134 and a data pointer 135. The values previously in address pointer 124 and pointer 125 are replaced, respectively, with an address pointer to the dynamic translator and a linkage table pointer which points to the linkage table entry which includes address pointer 134 and data pointer 135.

When the branch mechanism 122 effects a branch by loading address pointer 124 and pointer 125 from the linkage table entry, and then branching to the address specified by address pointer 124, the result is that the destination of the branch is the dynamic translator. The dynamic translator uses the information in pointer 125 to obtain the values in address pointer 134 and data pointer 135, in order to begin translation.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for performing debugging on a first application which resides in a computing system, the method comprising the steps of:

(a) dynamically translating a first block of code during runtime of the first application, the dynamic translation producing a translated block of code; and, (b) placing debugging code within the translated block of code.

2. A method as in claim 1 wherein the debugging code in step (b) includes a conditional breakpoint.

3. A method as in claim 2 wherein in step (a), the translated block of code is produced when during, execution of the first application, the first block of code is first called by the first application.

4. A method as in claim 2 wherein in step (a), the translated block of code is produced when, during execution of the first application, a debugger is ready to place the debugging code within the translated block of code.

5. A method as in claim 2 additionally comprising the following step performed concurrently with step (a):

(c) dynamically translating object code of the first application during runtime of the first application to produce translated object code, the translated block of code produced in step (a) being included within the translated object code.

6. A method as in claim 1 additionally comprising the following step:

(c) executing the translated block of code.

7. A computing system comprising:

a first application process, including a first block of code;

a dynamic translator which during runtime of the first application process translates the first block of code to produce a translated block of code; and, a debugger, the debugger including means for causing debugging code to be placed within the translated block of code.

8. A computing system as in claim 7 wherein the debugging code includes a break instruction.

9. A computing system as in claim 8 wherein the dynamic translator produces the translated block of code when, during execution of the first application, the first block of code is first called by the first application.

10. A computing system as in claim 8 wherein the dynamic translator produces the translated block of code when, during execution of the first application, the debugger is ready for the debugging code to be placed within the translated block of code.

11. A computing system as in claim 8 wherein the dynamic translator dynamically translates object code of the first application during runtime of the first application to produce translated object code, the translated block of code being included within the translated object code.

12. A computing system as in claim 7 additionally comprising:

(c) executing means for executing the translated block of code.

13. A method for performing debugging on a first application which resides in a computing system, the method comprising the steps of:

(a) dynamically translating the application during runtime of the first application to produce translated code, the dynamic translation including translating a first block of code to produce a translated block of code, the translated block of code being included within the translated code; and, (b) placing debugging code within the translated code.

14. A method as in claim 13 wherein the debugging code in step (b) includes a break instruction.

15. A method as in claim 14 wherein in step (a), the translated block of code is produced when during, execution of the first application, the first block of code is first called by the first application.

16. A method as in claim 14 wherein in step (a), the translated block of code is produced when, during execution of the first application, a debugger is ready to place the debugging code within the translated block of code.

17. A method as in claim 13 additionally comprising the following step:

(c) executing the translated code.

* * * * *